INVENTOR
BRUCE I. BERTELSEN
BY Owen L. Lamb
AGENT

United States Patent Office 3,361,659

Patented Jan. 2, 1968

3,361,659

PROCESS OF DEPOSITING THIN FILMS BY CATHODE SPUTTERING USING A CONTROLLED GRID

Bruce I. Bertelsen, Essex Junction, Vt., assignor to International Business Machines Corporation, Armonk, N.Y., a corporation of New York Filed Aug. 14, 1967, Ser. No. 662,270
14 Claims. (Cl. 204—192)

ABSTRACT OF THE DISCLOSURE

An improved method of sputtering in which the impurity contamination of the deposited films is controlled by the application of a potential to a grid located between the cathode and the anode. An electric field-free region is formed to prevent ions from entering the growing film or a slightly accelerating electric field is produced to increase sorption of ionized gases into the growing film.

*Cross reference to related applications*

The present application is a continuation-in-part of U.S. application Ser. No. 601,431, filed Dec. 13, 1966, now abandoned, entitled, "Deposition of Thin Films by Cathodic Sputtering." Application Ser. No. 601,431 is a continuation of U.S. application 332,590, filed Dec. 12, 1963, now abandoned, entitled, "Process of Depositing Thin Films by Cathode Sputering Using A Controlled Grid," now abandoned.

*Background of the invention*

This invention relates to the deposition of thin films and more particularly to methods for controlling the form and quality of a thin film deposited by cathode sputtering. The invention is particularly useful in the deposition of thin magnetic films, such as can be produced by the deposition of nickel-iron alloys (permalloy).

Thin magneitc films prepared on glass and metal substrates are used as memory and switching elements in digital computers, where high operational speed, large memory capacity, and manufacturing economy are important. The economical manufacture of such films giving the desired magnetic properties has become of major importance.

Several methods may be used for the preparation of these thin magnetic films, the most attractive being vacuum deposition and cathodic sputtering. Heretofore, sputtering has not been competitive with processes utilizing vacuum deposition because of the complexity of the seps involved. Further difficulties associated with sputtering include the problems of substrate temperature control, which effects reproducibility, magnetic field distortion due to the unavoidable presence of the permalloy (nickel-iron) cathode, and control of impurities which tend to contaminate the magnetic film. It is especially the lack of control of impurities which has led the prior art to favor vacuum deposition in which contamination of films by impurities is more satisfactorily controlled.

In a vacuum deposition process it is first necessary to deposit an adhesion layer of chromium onto a substrate. Next, a silicon monoxide layer is vacuum deposited to reduce the surface roughness in order to obtain good magnetic properties. The silicon monoxide also serves as a diffusion barrier. Finally, the magnetic film is vacuum deposited onto the prepared substrate. The vacuum deposition process has the advantage that only one type of apparatus is necessary, since all of the steps involve vacuum deposition.

A typical sputtering process would not require that an adhesion layer be deposited. Only two steps are necessary, the first being a vacuum deposition of a surface conditioning layer, for example silicon oxide, onto the substrate followed by the deposition of the magnetic layer by cathodic sputtering. While fewer steps are employed they are, at present, more complex. Both a vacuum deposition apparatus and a sputtering apparatus are necessary to carry out the steps, thus interrupting the manufacturing process. Because of this drawback, sputtering processes as presently carried out are not considered competitive with vacuum deposition.

Further, it is well known that sorption of gases by sputtered thin films alters the characteristics of the thin film. The type and extent of alteration depends upon the composition of the thin film, the gas being sorbed, the amount of gas being sorbed, and the distribution within the thin film of the sorbed gas. In the past, most people have primarily regarded sorbed gases as impurities that alter or destroy the desired characteristics of sputtered films of a pure material. Thus, they have been primarily concerned with the problem of minimizing the incorporation of gas species into the growing sputtered thin film. Prior art apparatus has either had means to keep away much of the gas species from the thin film or, more commonly, and means to bombard the growing film, in order to expel a high percentage of the gas species. (This is essentially a reverse sputtering in which the atoms of the substrate film are sputtered away.) In some cases it may be desirable to reduce the amount of gas incorporated into the thin films, but in doing so, the rate of growth of the film is slowed and therefore production is minimized.

One prior means of bombarding the growing film is to accelerate gas ions into the growing film. In this case, the energies used are substantially higher than the sputtering threshold energies, and hence sputtering from the growing film occurs. This reduces the net deposition rate, introduces radiation damage into the growing film, and substantially increases the heat input, making control of the temperature of the growing film more difficult.

Since the sorption of gases in sputtered films alters the characteristics of the sputtered films, a convenient method of altering the properties of thin films is possible, if it is not harmful for the films to contain gas ions. If an accurate control over the amount of gas included in the growing film can be obtained, the characteristics of the film can be controlled such that a high degree of uniformity in the sputtered films will result. Also, by varying the amount of sorbed gases from film to film, the characteristics of subsequent sputtered thin films may be controllably altered.

An attempt at controlling gas incorporation has been made by attempting to carefully control the partial pressure of the desired gas species into the sputtering environment. This "reactive sputtering" is a very difficult task and is generally inaccurate due to the kinetics and the thermodynamics of the sputtering system. The large fraction of gas particles arising at the substrate are electrically neutral and are moving with thermal energy. The incorporation of neutral gas particles into a thin film at a given pressure is dependent upon the velocity of the particles and the reactivity of the gas particles with the sputtered particles. Further, sorption of neutral thermal gas species have saturation points which substantially limit the amount of sorption possible with such a system.

In addition to the above problems with respect to reactive gas species, it is notable that inert gas species are not sorbed at all in their neutral state, and only to a slight extent in their ionized states at thermal energies. Thus, sorption of inert gas species is extremely difficult by prior techniques.

Therefore, it is an object of the present invention to simplify and to improve the efficiency of sputtering processes in the manufacture of thin films.

It is also an object of this invention to provide an improved method for depositing a thin film by cathodic sputtering on glass and metal substrates.

A further object of this invention is to provide a method by which a surface conditioning layer may be deposited onto a substrate without the necessity of resorting to a vacuum deposition step in the sputtering process.

A still further object is to provide a method for inducing the even wear of a source metal cathode in cathodic sputtering.

Still another object of the invention is to provide an improved method for controlling the sputtering rate and deposition time in a sputtering process.

Another object of the present invention is to provide an improved method for causing and controlling the sorption of gases into growing, sputtered thin films.

An additional object of the present invention is to provide a method accurately controlling the sorption of electronically excited metastable and ionized gases into growing, sputtered thin films.

A further object of the invention is to provide a method causing sorption of electronically excited metastable and ionized gases into growing, sputtered thin films beyond the saturation point, which limited gas incorporation in apparatus of the prior art.

*Summary of the invention*

Briefly, the above objects are achieved by the improved sputtering method of this invention, which includes the steps of establishing a glow discharge environment between a cathode and an anode, forming either an electric field-free region about the substrate or a small localized electric field about the substrate, and depositing the cathode atoms on the substrate.

If an electric field-free region is created very few, if any, ions will reach the substrate and only the sputtered cathode atoms will be deposited on the substrate, thereby producing very pure films.

If it is desired to inject gas ions into the growing film, a small electric field is formed in the vicinity of the substrate. In this case, the gas to be sorbed is injected into the glow discharge environment, the gases are ionized, and the resulting gas ions are accelerated toward the growing film such that, on the average, they impact the film with energies no greater than that energy level comprising the saturation point limiting incorporation of the specific gas into the specific growing film.

The above method is accomplished in accordance with the invention by applying a variable potential to a grid formed of wire, which grid is located between the anode and the cathode of a sputtering apparatus. The grid element is electrically controlled such that either an electric field-free region is created which prevents electron bombardment of the substrate and hence contamination of the deposited film, or a small electric field is created in the vicinity of the substrate, which small electric field induces the sorption of gases into the growing film. Since the grid can be of a positive potential with respect to the cathode, it will prevent negatively charged (OH) ions from contaminating the deposited film.

As will be illustrated, the grid is itself a complete electrical circuit so that a current can be passed through it. This grid can be located either within the cathode dark space distance or outside the cathode dark space distance. When positioned within this distance, the apparatus is operated either with or without grid current. When positioned outside the cathode dark space, the sputtering apparatus is usually operated without grid current although, with the grid shown in FIGURE 3, operation with grid current is also useful, as will be explained subsequently.

When used to create an electric field-free region about the substrate, the invention has the advantage that the use of the grid confines the electric field to the proximity of the cathode so that everywhere else within the work space the electric field is reduced to a negligible level. The use of the grid confines the glow discharge to the regions in proximity to the grid. This reduces substrate temperature and prevents dirt from contaminating the deposited material because there is reduced bombardment of the outer spaces, such as the bell jar. The use of the grid can also increase the efficiency of sputtering, as will be explained later.

Operation with a potential applied to the grid can also be useful in prolonging the life of the cathode. In this way thin cathodes can be used as sources when magnetic nickel-iron films are to be deposited. This is advantageous since the deposition magnetic field is disturbed if very thick cathodes are used.

Another advantage of this method is that the grid arrangement can be moved laterally between sputtering operations, in order to expose new areas of the cathode and thus permit control of the consumption of the cathode.

Still another advantage of this method is that it increases the sputtering rate from that area of the cathode which is beneath the grid wires. This compensates the effect of the often high rate of sputtering from the cathode to the cathode shield, thus causing a more uniform cathode consumption.

A further advantage is achieved by this method if an alternating current is applied to the grid. In this case, the region of fastest cathode etching will change throughout the current cycle, and sputtering will occur from the cathode to the grid wires which are positive at any given instant. Accordingly, the glow discharge and sputtering will predominate at varied positions on the cathode due to the varying local magnetic field between grid wires, and this will result in a more uniform cathode consumption.

When the invention is used to increase sorption of gas into the growing film, various advantages are also achieved. One of these is that the method set forth by the present invention makes efficient use of the gas to be sorbed, allowing a low partial pressure of such gas in the glow discharge sputtering environment.

Another advantage results from higher deposition rates that are produced with a minimum amount of structural damage induced by ion bombardment. Thus the production rate may be substantially increased, while at the same time the sorption of gas into the growing film is controlled.

The foregoing and other objects, features, and advantages of the invention will be apparent from the following more particular description of the preferred embodiments of the invention, as illustrated in the accompanying drawings.

*Description of preferred embodiment*

Figure 1:
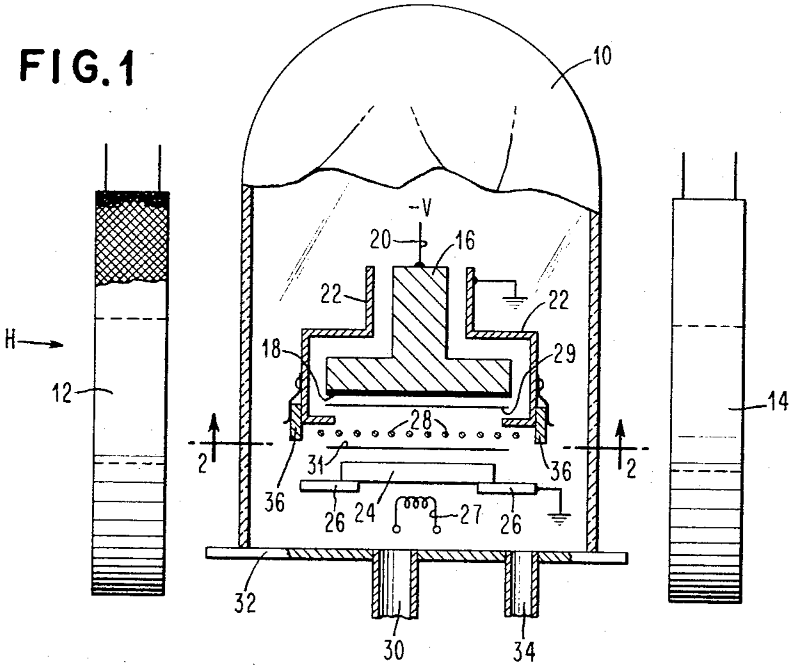
FIGURE 1 is a diagrammatic view, in partial vertical section, of an apparatus for carrying out the invention.

The invention will now be described with reference to FIGURE 1 which illustrates the overall glow discharge apparatus utilized in thin film sputtering devices. The apparatus is confined in bell jar 10 which is pressure resistant to accommodate evacuation to pressures within the range $10^{-1}$ to $10^{-7}$ torr. Two coils 12 and 14 are mounted externally to produce a uniform magnetic field in the vicinity of the glow discharge. These coils must be relatively large to maintain field uniformity over the substrate area.

The elements within the bell jar 10 comprise a cathode heat sink 16 to which is attached the deposit material source 18. The cathode 16 is directly connected to a negative voltage via voltage lead 20. A shield 22 is provided around the cathode 16 within the Crookes dark space distance from the cathode. The Crookes dark space distance is the region, measured from an electrode, which emits little or no light. The reason for this is that very few ions are present in the Crookes dark space. An opening is provided in this shield between the deposit material 18 and an anode 24 which is the substrate upon which the material is deposited. The anode 24 is grounded via support plate 26. A heater 27 is provided for heating the substrate 24. A grid 28 is physically attached to the shield 22. A movable shutter 29 is interposed between the cathode 18 and grid 28. Another shutter 31 is interposed between the grid 28 and anode 24.

The bell jar 10 rests on a support 32 provided with a port 30 for evacuating the bell jar. Another port 34 is provided for introducing a suitable gas, for example argon, into the work area to provide ionized particles.

Generally, the spacing between grid elements should be made equal to or greater than the dark space distance at the desired sputtering pressure. This need not always be the case, as the operation of the grid when current is passed through it will cause the dark space distance to decrease and, even though the grid space distance is less than the dark space initially, this inequality can be changed by the presence of grid current. This will be explained in more detail in the sections which describe the sputtering operation. In the embodiment shown in FIGURE 1, the grid is held at ground potential but its potential may be made adjustable for special purposes, as will be subsequently described.

Figures 2, 3:
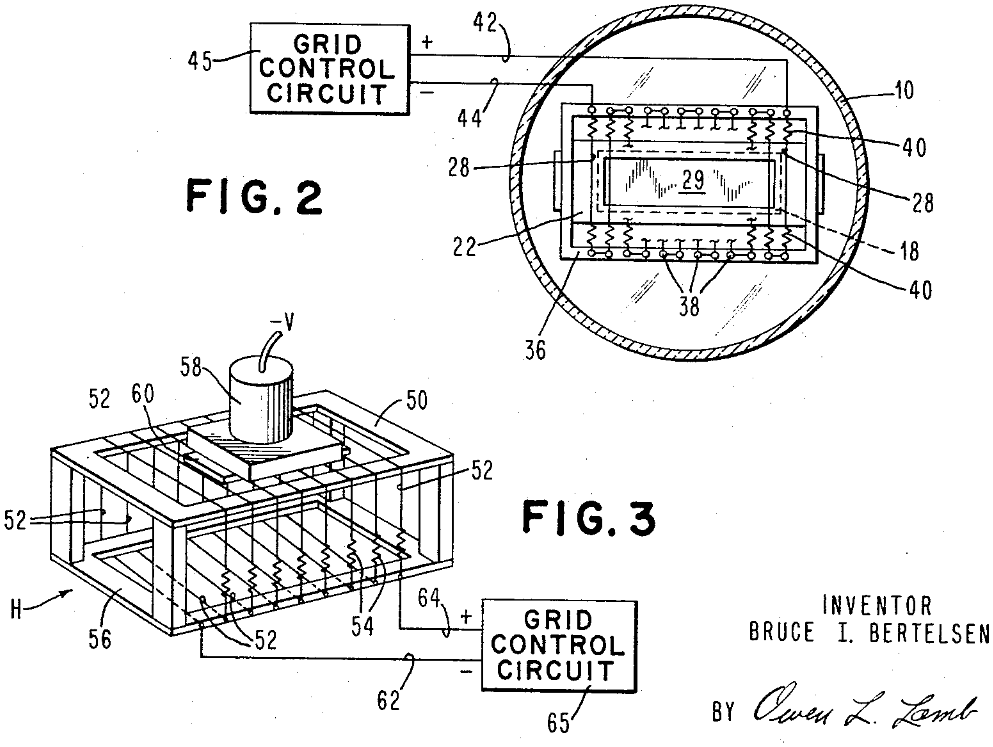
FIGURE 2 is a sectional view taken on line 2—2 of FIGURE 1.
FIGURE 3 is a perspective view of a second embodiment for carrying out the invention.

In FIG. 2 the apparatus of FIG. 1 is shown along the sectional lines 2—2. A frame 36 is provided having pins 38 to which the grid wires 28 are fastened under spring tension by means of springs 40. The wires are spring mounted to allow for thermal expansion during sputtering. The pins 38 are interconnected such that each grid element 28 is in series with the adjacent grid element. The series connected grid elements are connected via terminals 42, 44 to grid control circuit 45. The grid wires are made of a single refractory material which does not evaporate when hot and which will not be substantially injured by ion bombardment. An example of such a material is tantalum.

The sputtering apparatus with the exception of the grid 28 operates in accordance with principles well known in the prior art. Therefore, many of the details necessary to the successful operation of a sputtering apparatus have been omitted, since these details may be supplied by a person having ordinary skill in the art. The vacuum within the bell jar 10 is pumped down via duct 30. Argon gas is introduced into the chamber within the bell jar via inlet 34 which is regulated in conjunction with the vacuum duct 30 to maintain the pressure within the bell jar at the desired sputtering pressure. A voltage applied to the cathode 16 via lead 20 creates a voltage drop between the cathode assembly 16, 18 and the anode substrate 24 which is held at ground potential. A deposition magnetic (H) field is created in the direction of the arrow by energizing coils 12, 14. At this pressure and voltage the argon gas ionizes and these ions create the sputtering phenomena. The sputtering rate may be controlled by controlling the negative voltage on the cathode.

FIGURE 3 shows a grid configuration which is wound to provide the necessary deposition magnetic field as well as to confine the glow and control sputtering. The apparatus shown in FIG. 3 is similar to that shown in FIG. 1 with the exception that the externally applied magnetic field produced by coils 12 and 14 in FIG. 1 is unnecessary. A frame 50 is provided around which grid wires 52 are wound forming a coil. Springs 54 attached to terminals 56 are provided to maintain the grid elements under spring tension to account for thermal expansion. The cathode shield assembly 58 is located above the grid and houses a copper cathode to which is attached the magnetic metal to be deposited. The anode 60 is located opposite the cathode face beneath the grid, such that the grid encircles the anode and one plane of grid elements is located between the anode and cathode.

*(I) Electric field-free operation*

The sputtering process to be described in this section is one in which there is a substantially electric field-free region in the vicinity of the substrate. In this way very few, if any, ions will reach the growing film. The general steps of this operation are the following:

The glow discharge environment is established between the cathode and the anode by making the potential of the cathode negative with respect to the anode. For instance, the cathode can be maintained at a negative potential of a few thousand volts with respect to the anode. This will cause ionization of the gas atoms in the environment and these ions will then be drawn to the cathode, to which they will be drawn with sufficient energy to bombard the cathode and free atoms therefrom. The cathode, being the source, will be depleted by this bombardment and the cathode atoms will diffuse toward the substrate, upon which the film will grow. Another step in this process involves the formation of a field-free region about the substrate, by making the potential of the grid 28, which is located between the cathode and the anode, at least as anodic as that of the anode (substrate). In this way, cathode atoms will be deposited upon the anode since only the cathode atoms will be able to travel through the field-free regions, negative impurity ions being attracted to the grid while positive ions will be repelled from the substrate itself.

As was mentioned previously, the grid can be located either within the cathode (Crookes) dark space distance or outside the dark space distance. As is well known, the Crookes dark space is the region surrounding an electrode in which very few ions are present. That is, the mean free path of the electron is such that very few collisions with gas atoms occur within the dark space distance. The dark space distance is accordingly a function of the pressure of the gas in the system. The higher the gas pressure the shorter will be the mean free path of electrons before having collisions with the gas and, correspondingly, the shorter will be the dark space distance.

(A) GRID INSIDE CATHODE DARK SPACE

*(1) Operation with no grid current.*—The mode of sputtering here involves the steps of applying a negative voltage to the cathode so that its potential is negative with respect to the substrate anode and applying a voltage to the grid so that the potential of the grid is substantially the same as that of the anode. In order for sputtering to occur the grid spacing, i.e., the spacing between the wires of the grid, must be greater than the cathode dark space distance. If the grid spacing is less than the dark space distance when the grid is located within the cathode dark space, there will be no sputtering as the electrons will not be able to get through the grid to have collisions with the gas atoms. Therefore, very few ions will be created and negligible bombardment of the cathode will occur. Consequently, in the operation of the sputtering process with no grid current, the grid spacing is approximately equal to or greater than the dark space distance. The glow exists outside( between the grid and the anode) the grid in this case. An advantage of this particular mode of operation is apparent since it is generally preferred to have the substrate and grid somewhat negative with respect to ground, although ground potentials on the grid and the substrate are allowable. Because the grid is in close proximity to the cathode, the rate of cathode etching from those portions of the cathode under the grid wires will be approximately the same as the rate of etching which occurs near the cathode shield 22. That is, there is always a rapid rate of sputtering occurring between the cathode shield and the cathode, due to the close proximity of these elements. This tends to cause an uneven consumption of the cathode and, in the case of the thin cathodes which are used for deposition of magnetic materials, the uneven wear will reduce considerably the usefulness of the sources. Because the grid is in close proximity to the cathode in this operation, the rate of etching (or sputtering) from the main body of the cathode, located directly beneath the grid, will be approximately that which occurs between the cathode and the cathode shield. Therefore, more uniform cathode consumption will be achieved.

(2) *Operation with grid current.*—Here, current is to flow through the grid, which grid is located between the cathode and the anode and within the cathode dark space. The mode of sputtering in this case is the following:

A negative voltage is applied to the cathode such that its potential is negative with respect to the substrate anode;

A voltage is applied to the grid such that its potential will be substantially the same as that on the anode substrate; and A current will be applied through the grid, the current having a magnitude which is sufficient that the effective cathode dark space is reduced, so that the grid spacing becomes approximately equal to or greater than the dark space distance.

In this mode of operation the grid spacing can be either less than or greater than the dark space distance. This is so because the current through the grid will create a magnetic field which in turn will bend the electron paths, thus causing the linear mean free path of the electrons, as measured from the cathode, to be less. Since the linear mean free path of electrons from the cathode is a measure of the cathode dark space distance, a reduction in the linear mean free path will mean a reduction in the cathode dark space distance. When the inequality is such that the grid spacing is approximately equal to or greater than this dark space distance, the electron paths will be increased such that electron-atom collisions will occur, causing ionization of the noble gas, within the vicinity of the grid. In this mode of operation sputtering will occur, as the gas ions will then be attracted to the cathode. Of course, if the grid spacing is already greater than the cathode dark space distance, sputtering will occur without the need for grid current.

The operation described in the preceding paragraph can be utilized as a control of the onset of sputtering. For instance, when a grid is located within the cathode dark space distance and such grid has grid spacing less than the cathode dark space distance, sputtering will not occur until sufficient grid current flows through the grid such that the magnetic field thereby created produces the inequality that the grid spacing is approximately equal to or greater than the cathode dark space distance. When this inequality (grid spacing≧dark space) is reached, sputtering will start, as mentioned previously, since the electrons will then be able to get through the grid spacing to collide with gas atoms.

The advantage of this mode of operation wherein the grid is placed within the cathode dark space distance and grid current flows is that, by changing the grid current, the rate of change of highest edge of the cathode can be changed. That is, since the electrons will follow the magnetic field lines, the rate of etching from the cathode will be changed with the magnitude of the grid current. It is advisable to increase the cathode consumption such that the wear from the main face of the cathode is the same as the wear which is induced by sputtering between the cathode and the cathode shield, as previously mentioned.

It is possible to use either AC or DC current through the grid. If DC current is used, the rate of cathode etching will change with the level of DC current. In order to create a uniform consumption along the cathode, the grid can be moved laterally (horizontally) such that even distribution of the cathode results. This follows from the description in the above paragraph, in which it was stated that the regions of highest etch of the cathode follow generally the magnetic field lines created by the grid current. If the grid is moved horizontally, the magnetic field lines will be displaced also and therefore the region of highest etching will also be displaced.

If an alternating current is used as the grid current, it is not necessary to laterally displace the grid in order that uniform cathode consumption results. This is so since, as the current changes in each half cycle, the region of fastest etching will move between alternate grid wires. That is, the region of greatest cathode etching will constantly move as the magnetic field amplitude and direction change.

An externally applied field has an effect on ionization efficiency and cathode dark space length (see "Vacuum Deposition of Thin Films," L. Holland, John Wiley and Sons—1960). Therefore, if an alternating current is applied to the grid, as mentioned above, the externally applied field vectorially adds to the field generated by current in the grid. This results in glow and sputtering predominating under alternate grid wires during any given current half cycle, which assists in achieving more uniform cathode consumption, in the manner set forth above. In the configuration shown in FIGURES 1 and 2, care must be taken that the grid magnetic field resulting from the current passed through the grid does not distort the externally applied deposition field at the substrate. In this regard, if the grid is wound with a ratio of grid wire spacing to grid-substrate distance of approximately 1 to 10, with a grid current of not more than 10 amps., appreciable distortion of a 25 oe. applied magnetic field should not occur.

Thus, it is seen that a mode of sputtering operation can be achieved when the grid is placed within the cathode dark space or outside the cathode dark space. When the grid is placed within the cathode dark space distance, the grid spacing may be either less than or greater than the cathode dark space distance. If the grid spacing is less than the dark space distance, sputtering will not start until a sufficient current is passed through the grid such that the grid space distance will be approximately equal to or greater than the dark space distance. When this inequality is obtained, sputtering will commence. If the grid spacing is greater than the dark space distance, current need not be passed through the grid in order to have sputtering commence. Both direct and alternating currents can be applied to the grid. Further, in order to create a field-free region about the substrate, the potential of the grid is made substantially that of the substrate anode, while the cathode is much more negative than the anode.

(B) GRID OUTSIDE CATHODE DARK SPACE (1) *Operation with no grid current.*—Here, the grid spacing can be either less than or equal to the cathode dark space distance. Since the grid is located outside the cathode dark space, the glow discharge will exist between the cathode and the grid. This mode of sputtering comprises the following steps:

A negative voltage is applied to the cathode so that its voltage is negative with respect to the anode substrate;

A voltage is applied to the grid so that its potential is substantially the same as the potential of the substrate.

Here, as mentioned previously, the grid wire spacing can be either less than or equal to the cathode dark space distance. If the grid spacing is less than the cathode dark space distance, the glow discharge will be between the grid and the cathode. If the grid spacing is greater than the dark space distance, the glow will also extend beyond the grid, i.e., to the region between the grid and the anode. This will be so since electrons will be able to go through the grid and excite gas atoms which are located outside the grid (that is, between the grid and the anode). However, the use of the grid confines the glow to the region of the grid, so that ion impairment of the growing film is reduced.

The advantage of this particular mode of operation is that the potential around the substrate can be held at a minimum, so that most of the incoming negative ions ($OH^-$, for instance) and the electrons will be collected on the grid instead of bombarding the substrate. Further, because the grid is approximately the same potential as the substrate, or slightly positive with respect to the substrate, the grid will act somewhat like the anode and will collect most of the negative ions, since it is in closer proximity to the cathode. Further, a field-free region will be created about the substrate so that very few ions will impinge upon the growing film. In this way, prevention of impurity contamination will result. This is best achieved using the grid of FIGURE 3, which completely surrounds the substrate. The use of this grid will therefore eliminate ion impurities which come from any direction.

(2). *Operation with grid current.*—Here, sputtering operation is achieved with the grid located outside the cathode dark space and with current flowing through the grid. The grid spacing can be either less than or greater than the cathode dark space distance. The method of sputtering here comprises the steps of applying a voltage such that the potential of the cathode is negative with respect to the anode and applying a voltage to the grid so that its potential is the same as that of the anode or slightly positive with respect to the anode, and passing a grid current through the grid.

Normally, the passage of grid current through the grid will not provide significant advantages unless the grid of FIGURE 3 were used. This grid would be used when a magnetic material, such as permalloy (nickel-iron), is being deposited, as an external magnetic field would be necessary in order to create the required uniaxial anisotropy. Generally, it would be more desirable to change the bias on the grid, rather than change the current through the grid, in order to achieve sputtering advantages.

In general, it is apparent that sputtering processes can be achieved with the grid located outside the cathode dark space distance. These processes can occur with the grid having no current flowing therethrough and also with a grid current present although, as mentioned above, the advantages of grid current are minimal when the grid is located outside the cathode dark space distance. When the grid is located outside the cathode dark space distance, the collection of negative particles is perhaps more efficient, although in general, good sputtering is also achieved when the grid is located within the cathode dark space distance. However, if the grid is located too close to the substrate, it will tend to act as a mask or shadowing device, and an even deposition of thin films will not occur.

Generally, in the deposition of magnetic thin films, an oxide is needed on the substrate before good adhesion of the magnetic film will result. In this case, the grid is floated, i.e., no bias is applied to the grid. It is not even grounded. When a glow discharge is achieved by making the potential of the cathode more negative than that of the anode, oxidation will take place from the oxygen in the system and from the oxygen which is on the surface of the substrate. After a few atomic layers (approximately 20 A.) of oxide are formed, grid bias is applied and then the magnetic film is deposited. Here, the grid bias is at about the same potential as the anode substrate or slightly positive thereto.

By using the grid as a source for sputtering the surface treating layer onto the substrate, the necessity of forming this coating by vacuum deposition is avoided. The entire manufacturing process of forming the magnetic thin film is thus greatly simplified. First the grid 28 is coated with a suitable surface treating material, such as silicon monoxide or dioxide particles from a slurry. Shutters 29 and 31 are initially closed to protect the anode and cathode. A high frequency is superimposed on a high negative voltage to the grid by grid control circuit 45, causing the grid wires to go slightly negative on each half cycle thus discharging the insulating slurry allowing further ion bombardment. Heating takes place with bombardment which reduces silicon oxide resistivity and further aids surface discharge. The shutter 31 is opened and silicon oxide is deposited onto the substrate 24. Contamination of the cathode 18 is prevented by leaving shutter 29 closed. Next, the shutter 31 is closed, and the negative voltage removed from the grid. The final steps include applying a negative voltage to cathode 16, 18 while holding the grid at the same potential as the anode. Opening both shutters 29 and 31 allows the magnetic source material 18 to be deposited on the anode substrate 24, completing the process.

The sputtering process when the grid of FIGURE 3 is used is essentially the same as that outlined above. The plane of grid wires which is located between the cathode and the anode can be either within the cathode dark space distance or outside the cathode dark space distance. Because of the proximity of the magnetic field creating grid coil, a relatively large deposition magnetic field is maintained within the work space area with a relatively few number of turns. Thus, the coil-grid arrangement of FIGURE 3 has a two-fold function of providing the necessary deposition magnetic field as well as confining the glow and controlling sputtering.

All the internal apparatus may be cleaned by closing shutter 31 and applying a high potential to the grid, causing the usual glow to fill the work space. Following this, the grid potential is reduced to ground level and intensive cleaning of the cathode is completed before opening the shutter 31 protecting the substrate.

In summary, the invention thus far relates to sputtering processes in which the grid is held near ground potential or at the same potential as the anode or at an adjustable potential for special purposes, such as controlling the cathode consumption and the sputtering rate. An essentially field-free region is created about the substrate so that ion contamination of the substrate is kept to a minimum. Grid current may or may not be present, and the grid may be located within the cathode dark space or outside the cathode dark space.

*(II) Sorption of gases*

Another feature of this invention is that the sorption of electronically excited metastable and ionized gases by the sputtered thin film can be controlled through the use of potentials applied to the grid. This mode of sputtering has advantages since the sorption of gases in sputtered films alters the characteristics of the films. Because the method of this invention provides an accurate control over the amount of gas included in a growing film, there is obtained an accurate control over the characteristics of the film. In general, the method for sputtering thin films where gases are sorbed into the thin film comprises the steps of establishing a glow discharge environment, injecting the gas to be sorbed into the environment, ionizing a portion of the gas, and accelerating ions of the gas toward the growing film. The ions of the gas are accelerated such that, on the average, they impact the film with energies no greater than that energy level comprising the saturation point limiting incorporation of the specific gas into the specific growing film. To accomplish the sorption, an electric potential gradient is established with respect to the thin growing film for accelerating ionized gas particles toward the thin film at less than the sputtering threshold energies. To achieve his electric potential gradient, a positive potential is applied to the grid 28, relative to a grounded anode.

It is a well established fact that the incorporation of gas in a thin film influences its physical properties very significantly. Numerous publications are available demonstrating this fact for various types of thin films. Examples are: (1) with respect to magnetic thin films—A. J. Noreika and M. H. Francombe, Journal of Applied Physics, No. 33, Pages 1119, ff., 1962; (2) electrical thin films—D. Gerstenberg and C. J. Calbick, Journal of Applied Physics, No. 35, Pages 402 ff., 1964; (3) superconducting thin films—H. L. Caswell, Journal of Applied Physics, No. 32, Pages 105 ff., 1961; (4) semiconducting thin films—C. S. Herrick, Abstract 70, The Electrochemical Society, April 15–18, 1963; and (5) photoconducting thin films—G. Heiland, Journal of the Physics & Chemistry of Solids, No. 22, Pages 227 ff., 1961. In a specific case, argon could be the gas that is sorbed into the thin film, although any gas can be sorbed by the method of the present invention. Reference to the above articles is helpful in determining what gas should be put into the growing film.

If sputtering is started as in the conventional way, i.e., by applying a very negative bias to the cathode with respect to the anode, and 20 volts is applied to the grid, (a voltage difference of 20 volts between the grid and the anode), any positive gas ions reaching the space between the grid and the anode will be accelerated by the 20 volt potential toward the substrate and the anode. This small potential of 20 volts does not, however, provide sufficient energy to the accelerated gas ions to eject a discernible number of particles from the growing thin film upon impact. Instead, the gaseous ions have sufficient energy to become bonded to the growing thin film. Therefore, it is seen that the amount of gas incorporated in the growing thin film can be made greater than the amount of gas which would be incorporated by means of conventional sputtering processes. This is so since, with conventional sputtering processes, only a very small portion of the gas ions could be incorporated into the sputtered thin film, which amount depended upon the amount of gas present, the temperature of the gas, etc.

Increasing the voltage on the grid does not merely increase the proportion of ions directed toward the anode, but additionally increases the total amount of ionization. Thus, the grid voltage enhances the sputtering rate (thereby enhancing the film growth rate) bombardment and velocity.

This description shows that enhanced sorption is accomplished at energies much lower than heretofore anticipated and effective sorption is allowed at accelerating voltages either below or not in large access of the sputtering threshold level. It follows that this allows higher deposition rates than otherwise would be possible, without structural damage to the film. This is possible since, at greater than sputtering threshold energies, ion bombardment tends to damage the films. Using these low energies to incorporate the gas means that the film will not be damaged and therefore the activation energy for desorption will be greater than that for structurally damaged films. Therefore, the gas atoms are more permanently incorporated into the thin film. An upper limit exists in the grid bias voltage with respect to the anode for proper sorption of gas into the thin film, this upper limit being of the order of approximately 30 ev. At grid-anode voltage differences greater than approximately 30 volts, incipient sputtering will occur from the anode. If the potential difference between the grid and the anode is thus lowered, to less than approximately 30 volts, gas sorption into the substrate will occur. Thus, there is a cleaning, then deposition step. The upper limit (approximately 30 volts) comprises the saturation point, limiting incorporation of the specific gas into the growing film. At anode-grid voltages exceeding this upper limit, no additional gas can be sorbed; instead, increased sputtering of the anode will start. By grounding the grid, the enhanced gas absorption is reduced significantly, if this is desired. In this manner, operation can be achieved utilizing the "field-free" aspect of this invention described above.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of sputtering thin films from a cathode to an anode, comprising the steps of:
   bombarding said cathode with ions to free atoms therefrom, said ions being produced by making the potential of said cathode negative with respect to said anode;
   forming a field-free region about said anode by making the potential of a grid, which grid is positioned between said anode and said cathode, at least as anodic as that of said anode;
   depositing said cathode atoms on said anode, only said cathode atoms traveling through said field-free region, so that negative impurity ion contamination of said deposit is reduced.

2. A method of sputtering thin films from a cathode to an anode, wherein more uniform cathode consumption is provided, comprising the steps of:
   positioning a grid, whose grid spacing is greater than the cathode dark space distance, between said cathode and said anode and within the cathode dark space distance;
   bombarding said cathode with ions to free atoms therefrom, said ions being produced by applying a voltage to said cathode so that its potential is negative with respect to said anode;
   forming a field-free region about said anode by making the potential of said grid at least as anodic as that of said anode;
   depositing said cathode atoms on said anode, the potential on said grid forming a high electric field between said grid and said cathode to approximate the high electric field which exists between said cathode and a shield surrounding said cathode.

3. A method for controlling the on-set of sputtering from a cathode to an anode, comprising the steps of:
   positioning a grid whose spacing is less than the cathode dark space distance between said cathode and said anode, substantially parallel thereto, and within the cathode dark space distance;
   applying a voltage to said cathode so that its potential is negative with respect to said anode;
   forming a glow discharge between said grid and said cathode by passing a direct current through said grid;
   bombarding said cathode with ions to free atoms therefrom, said positive ions being produced only when said current is passed through said grid;
   depositing said cathode atoms on said anode, said atoms being deposited only when said cathode dark space distance is reduced to a value less than said grid spacing by the action of the magnetic field created by said current flowing through said grid.

4. A method for controlling the on-set of sputtering from a cathode to an anode, wherein more uniform cathode consumption results, comprising the steps of:
   positioning a grid between said cathode and said anode, substantially parallel thereto, and within the cathode dark space;
   applying a voltage to said cathode so that its potential is negative with respect to said anode;
   forming a glow discharge between said grid and said cathode by passing an alternating current through said grid;
   bombarding said cathode with ions to free atoms therefrom, said positive ions being produced only when said current is passed through said grid;
   depositing said cathode atoms on said anode, said atoms being deposited only when said cathode dark space distance is reduced to a value less than said grid spacing by the action of the magnetic field created by said current flowing through said grid.

5. A method of sputtering thin films from a cathode to an anode, wherein negative ions do not impinge upon said anode, comprising the steps of:

bombarding said cathode with ions to free atoms therefrom, said ions being produced by applying a voltage to said cathode so that its potential is negative with respect to that of said anode;

forming a field-free region about said anode by making the potential of a grid positioned between said anode and said cathode, substantially parallel thereto, and outside the cathode dark space distance, at least as anodic as that of said anode;

depositing said cathode atoms on said anode, only said cathode atoms traversing said field-free region to impinge upon said anode.

6. A method of sputtering very pure magnetic thin films from a cathode to an anode, comprising the steps of:

forming a deposition magnetic field about said anode by passing current through a grid which surrounds said anode;

bombarding said cathode with ions to free atoms therefrom, said ions being produced by applying a voltage to said cathode so that its potential is negative with respect to said anode, thereby causing a glow discharge between said cathode and said anode;

forming a field-free region about said anode by making the potential of said grid at least as anodic as that of said anode;

depositing said cathode atoms on said anode, the deposited film having a uniaxial anisotropy determined by the direction of said deposition magnetic field, wherein this deposition magnetic field also prevents impurity ion contamination of said substrate.

7. A method of sputtering thin films by glow discharge within a vessel comprising an enclosed vacuum chamber in which a sputtering pressure is maintained, a cathode, a substrate anode, and a grid coated with material to be deposited as a surface treating layer on the substrate and placed between said cathode and anode within a dark space distance of said cathode, the method comprising the steps of:

closing a shutter between the grid and the cathode to thereby protect the cathode during the subsequent steps;

applying a negative voltage to the grid with respect to the substrate anode to thereby sputter the material coated on the grid onto the anode;

removing the negative voltage from the grid;

applying a negative voltage to the cathode with respect to the substrate anode while at the same time maintaining the voltge of the grid substantially at the same potential as said anode; and opening said shutter to allow deposition of the cathode material onto the substrate.

8. A method of sputtering a thin film from a cathode to a substrate, said film having an exact, desired amount of ionizable gas incorporated therein, comprising the steps of:

establishing a glow discharge sputtering environment arranged to deposit a material on said substrate;

adding a desired amount of said ionizable gas into said environment;

ionizing a proportion of said ionizable gas; and propelling a desired portion of said ionized gas toward said substrate by making the potential on a grid, positioned between said cathode and said substrate, slightly different than the potential of said substrate, so that said gas impacts the growing film on said substrate with energies no greater than that energy level comprising the saturation point limiting incorporationof said ionizable gas into said growing film.

9. A method of continuously sputtering a thin film from a cathode to a substrate, said film having an exact, desired amount of ionizable gas incorporated therein. comprising the steps of:

establishing a glow discharge sputtering environment arranged to continuously deposit a material on said substrate;

continuously adding a desirable amount of said ionizable gas into said environment;

continuously ionizing a proportion of said ionizable gas; and propelling a desired portion of said continuously supplied ionized gas toward said substrate by making the potential on a grid, positioned between said cathode and said substrate, slightly different than the potential of said substrate, so that said gas continually impacts the growing film on said substrate with energies no greater than that energy level comprising the saturation point limiting incorporation of said ionizable gas into said growing film.

10. An improved method of sputtering a thin film from a cathode to a substrate, said film having ionizable gas sorbed therein, comprising the steps of:

evacuating the space surrounding said substrate to obtain a near vacuum containing only a desired amount of said ionizable gas;

continuously depositing a material on said substrate;

ionizing throughout said deposition a portion of said ionizable gas; and propelling a portion of said ionized gas toward said substrate by making the potential on a grid, positioned between said cathode and said substrate, slightly different than the potential of said substrate, to impact the growing film on said substrate with energies no greater than that energy level comprising the saturation point limiting incorporation of said ionizable gas into said growing film.

11. An improved method of sputtering a thin film from a cathode to a substrate to create a coating thereon, said coating having an ionizable gas incorporated therein, comprising the steps of:

evacuating the space surrounding said substrate;

adding a desired amount of said ionizable gas into said space;

ionizing said ionizable gas;

depositing a material on said substrate; and propelling a portion of said ionized gas toward said substrate by making the potential on a grid, positioned between said cathode and said substrate, slightly different than the potential of said substrate, to impact the growing coating on said substrate with energies no greater than that energy level comprising the saturation point limiting incorporation of said ionizable gas into said growing film.

12. An improved method of sputtering a thin film from a cathode to a substrate, said film comprising a selected material and having a desired amount of ionizable gas sorbed therein, comprising the steps of:

evacuating the space surrounding said substrate;

adding a desired amount of said ionizable gas into said evacuated space;

ionizing said ionizable gas;

propelling a portion of said ionized gas toward said selected material by making the potential on a grid, positioned between said cathode and said substrate, sufficiently different than the potential of said substrate to impact said material at greater than sputtering threshold energies, whereby particles of said material are ejected therefrom to condense on said substrate; and propelling another portion of said ionized gas toward said substrate by changing the potential of said grid so that it is only slightly different than the potential of said substrate, to impact said film on said substrate with energies no greater than that energy level comprising the saturation point limiting incorporation of said ionizable gas into said growing film.

13. A method of sputtering a thin film from a cathode to a substrate, said film having an exact desired amount of ionizable gas incorporated therein, comprising the steps of:

establishing a glow discharge sputtering environment arranged to deposit a material on said substrate;

adding a desired amount of said ionizable gas into said environment;

ionizing a proportion of said ionizable gas; and propelling a desired portion of said ionized gas toward said substrate, by making the potential of a grid, positioned between said cathode and said substrate, slightly different than the potential of said substrate, so that said gas impacts the growing film on said substrate at an energy level less than approximately 30 electron volts.

14. An improved method of coating a surface with a film comprising a selected material, said film having a desired amount of ionizable gas sorbed therein, comprising the steps of:

evacuating the space surrounding said surface;

adding a desired amount of said ionizable gas into said evacuated space;

ionizing said ionizable gas;

propelling a portion of said ionized gas toward said selected material by making the potential of a grid, positioned between said cathode and said surface, greater than approximately +30 volts with respect to the surface, to impact said material at greater than sputtering threshold energies, whereby particles of said material are ejected therefrom to condense on said surface; and propelling another portion of said ionized gas toward said surface by making the potential of said grid slightly different than the potential of said substrate, so that said gas impacts said film on said surface at an energy level less than approximately 30 electron volts.

References Cited

UNITED STATES PATENTS

| | | | |
|---|---|---|---|
| 3,021,271 | 2/1962 | Wehner | 204—192 |
| 3,257,305 | 6/1966 | Varga | 204—192 |

FOREIGN PATENTS

| | | |
|---|---|---|
| 939,275 | 10/1963 | Great Britain. |

HOWARD S. WILLIAMS, *Primary Examiner.*

ROBERT K. MIHALEK, *Examiner.*

Notice of Adverse Decision in Interference

In Interference No. 96,354 involving Patent No. 3,361,659, B. I. Bertelsen, PROCESS OF DEPOSITING THIN FILMS BY CATHODE SPUTTERING USING A CONTROLLED GRID, final judgment adverse to the patentee was rendered May 29, 1969, as to claims 1 and 5.

[*Official Gazette August 5, 1969.*]

Disclaimer 3,361,659.—*Bruce I. Bertelsen*, Essex Junction, Vt. PROCESS OF DEPOSITING THIN FILMS BY CATHODE SPUTTERING USING A CONTROLLED GRID. Patent dated Jan. 2, 1968. Disclaimer filed Aug. 22 1969, by the assignee, *International Business Machines Corporation*.

Hereby enters this disclaimer to claims 1 and 5 of said patent.

[*Official Gazette December 16, 1969.*]

UNITED STATES PATENT OFFICE

CERTIFICATE OF CORRECTION

Patent No. 3,361,659 January 2, 1968

Bruce I. Bertelsen

It is certified that error appears in the above identified patent and that said Letters Patent are hereby corrected as shown below:

Column 1, lines 28 and 29, "December 12, 1963" should read -- December 23, 1963 --.

Signed and sealed this 20th day of January 1970.

(SEAL)
Attest:

Edward M. Fletcher, Jr.
Attesting Officer

WILLIAM E. SCHUYLER, JR.
Commissioner of Patents